United States Patent Office.

JUNIUS SCHENCK, OF BROOKLYN, NEW YORK.

Letters Patent No. 99,485, dated February 1, 1870.

IMPROVED METHOD OF PROTECTING THE ENDS OF VULCANIZED INDIA-RUBBER OR COMBINATION HOSE.

The Schedule referred to in these Letters Patent and making part of the same.

*To all whom it may concern:*

Be it known that I, JUNIUS SCHENCK, of Brooklyn, county of Kings, and State of New York, have invented a certain new and improved Method of Protecting the Ends of Vulcanized India-Rubber or Combination Hose; and I hereby declare the following to be a full, clear, and exact description of the same.

It is well known that the ends of rubber hose, such as used in conveying water to and from fire-engines, and for other similar purposes, sometimes become impaired near where it is joined to the coupling.

The object of my invention is to protect the hose at the ends, and thereby prevent deterioration at that part; and for this purpose, My invention consists in applying a metallic cap or cup to the end of the hose, so as to completely enclose and seal up the exposed ends of the several plies of duck or other fabric which make up the hose, thereby preventing the entrance of any water to the fibres of the hose, and also protecting that part of the hose against injury or knocks. For this purpose, I take thin sheet-brass, copper, or other metallic substance, from which I form a cap or cup, spun or formed from the metallic substance, with an inner and outer lip, the outer extending about one inch and a half, and the inner about an inch, and with a square shoulder on one end, which is to be the outer or exposed end when applied. I apply this cap or cup to the ends of the hose in the following manner:

First, cut the ends of the hose perfectly square and true. Then cement the cotton or the fabric exposed, which composes the body of the hose, with India-rubber or gutta-percha cement, or its equivalents. Then slip on the cap or cup, one part or lip of which covers the outside circumference of the hose, and the other part or lip the inside circumference. When this has been done, the hose is then ready to receive the coupling. This I securely fasten by banding with a clamp, part of which laps on the edge of the lip surrounding the outside circumference of the hose, and the whole being then fastened complete by the clamp or band. It makes a perfectly water-tight joint, both inside and out, which prevents any moisture from being absorbed by or taken up into the canvas by capillary attraction.

A method of covering the ends of hose with rubber has long been known to the manufacturers of rubber hose. Said process was in use some years ago, but has been generally abandoned, on account of the difficulty in application, and its not answering fully the purpose.

My method, being simple in its construction and application, gives a serviceable finish to the hose when coupled, and also forms a true and perfect shoulder for the female part of the coupling to work against, and prevents the ends of the hose from being chafed by sand, grit, or like substances.

What I claim, and desire to secure by Letters Patent, is—

1. Protecting the ends of vulcanized India-rubber or combination hose by means of a metallic cap or cup, substantially as in the manner described.

2. As a new article of manufacture, for protecting the ends of vulcanized India-rubber or combination hose, the metallic cap or cup, the same being applied and used substantially as shown and set forth.

JUNIUS SCHENCK.

Witnesses:
HOWARD M. TWOMBLY,
A. C. BENEDICT, Jr.